United States Patent [19]

Ide

[11] Patent Number: 5,795,376
[45] Date of Patent: Aug. 18, 1998

[54] COATED PIGMENT AND COLORANT COMPOSITION

[75] Inventor: Yusaku Ide, Tokyo, Japan

[73] Assignee: Toyo Ink Manufacturing Co., Ltd., Tokyo, Japan

[21] Appl. No.: 924,650

[22] Filed: Sep. 5, 1997

Related U.S. Application Data

[63] Continuation of Ser. No. 421,319, Apr. 13, 1995, abandoned.

[30] Foreign Application Priority Data

Apr. 15, 1994 [JP] Japan ................................ 6-076922

[51] Int. Cl.$^6$ ............................................ C09D 11/00
[52] U.S. Cl. ............. 106/31.73; 106/31.6; 106/31.65; 106/31.66; 106/31.67; 106/31.72; 106/493; 106/494; 106/499; 106/500
[58] Field of Search ....................... 106/493, 494, 106/499, 500, 31.6, 31.65, 31.66, 31.67, 31.72, 31.73

[56] References Cited

U.S. PATENT DOCUMENTS 5,366,546  11/1994  McCrae et al. ..................... 106/413

FOREIGN PATENT DOCUMENTS 0 150 776  8/1985  European Pat. Off. .
0 544 441  6/1993  European Pat. Off. .

OTHER PUBLICATIONS

Dainippon Ink & Chem., Database WPI, Section Ch, week 9521, Derwent Publications Ltd., London GB, Class A25 AN95-157647 JP-A-06 279 561, Oct. 1994.

Primary Examiner—Mark L. Bell
Assistant Examiner—Scott L. Hertzog
Attorney, Agent, or Firm—Wenderoth, Lind & Ponack, L.L.P.

[57] ABSTRACT

A coated pigment highly surface-modified with a substantially water-insoluble organic surface modifier, produced by preparing a mixture of water and a substantially water-insoluble organic surface modifier, pressurizing the mixture, introducing the mixture into a flow path having a diameter-decreased portion and a turning portion to cause a shear force in the mixture of which the flow is accelerated while the mixture is passing the diameter-decreased portion, mutual collision of the mixture of which the flow has been accelerated or collision of the mixture of which the flow has been accelerated against a wall constituting the flow path, thereby obtaining an aqueous dispersion in which the substantially water-insoluble organic surface modifier is homogeneously dispersed in the water, mixing the aqueous dispersion with the pigment to coat the pigment with the substantially water-insoluble organic surface modifier, and isolating the pigment coated with the substantially-water-insoluble organic surface modifier.

8 Claims, 2 Drawing Sheets

COATED PIGMENT AND COLORANT COMPOSITION

This application is a continuation of now abandoned application Ser. No. 08/421,319, filed Apr. 13, 1995.

FIELD OF THE INVENTION

The present invention relates to a coated pigment formed by coating a pigment with a substantially water-insoluble organic surface modifier and a colorant composition containing the coated pigment. More specifically, it relates to a pigment having suitability for use in a coating composition, an ink, a plastic, a printing dye, a toning agent, a color tone and other coloring materials, and a colorant composition containing the pigment.

PRIOR ART OF THE INVENTION

A pigment is widely used as a colorant composition in the field of coloring materials, and is required to have handling properties and qualities suitable for use in the field. For example a pigment is required to have dispersibility, fluidity, concentration, gloss, clearness, viscosity, stability with time and other properties suitable for use in the field. For imparting a pigment with these properties, generally, the pigment is surface-coated with an organic surface modifier.

Generally, the above surface modification is effectively carried out in an aqueous system, since the pigment is mainly produced in an aqueous system and since the pigment is present in a fine particulate state in an aqueous system without forming dry aggregates. Currently, there are a variety of organic compounds serving as insoluble organic surface modifiers which are known to impart a pigment with the above suitable properties. On the other hand, an organic surface modifier which is substantially insoluble in water cannot be used alone in an aqueous system. As a result, some water-insoluble organic surface modifiers have been improved in various ways to apply them to the surface modification of pigment in an aqueous system.

A water-insoluble organic surface modifier in a liquid state is emulsified by a surfactant for use in an aqueous system, or it is emulsified by a rosin for that purpose in JP-A-5-230390. However, only a limited number of water-insoluble organic surface modifiers can be emulsified.

When a pigment is surface-modified by an emulsion, the pigment containing the surfactant or a rosin may cause bleeding and defective water resistance in a gravure ink or a coating composition, migration in a plastic, or defective emulsification in an ink. Thus a pigment containing a surfactant or a rosin is limited in use. Further, an emulsified water-insoluble organic surface modifier may have only an insufficient surface modification effect since it has a large particle diameter as compared with the particle diameter of a pigment.

When the water-insoluble organic surface modifier is a solid, a solid pigment is surface-modified by mixing it with the solid modifier since the surface modification cannot be carried out in an aqueous system. However, this surface modification in a solid state is limited to an organic pigment derivative on which the solid modifier itself can be adsorbed. Some substantially water-insoluble solid surface modifier having a low melting point may be mixed with a pigment which requires a pigment-forming step of mechanically finely milling it with a kneader, an atritor or a Banbury mixer, such as phthalocyanine blue or dioxazine violet, at a temperature higher than the melting point of the above solid organic surface modifier. Since the 100° C., the substantially water-insoluble organic surface modifiers used are in a semi-solid state when surface-coating a pigment. However, since a crystal of a pigment grows excessively at a high temperature and the substantially water-insoluble organic surface modifiers are in a semi-solid state. However, it is difficult to uniformly coat pigment particles with the modifier and as a result, the surface modification effect thereof is inevitably insufficient. Currently, a rosin derivative is the only substantially water-insoluble organic surface modifier that is suitable for use in the above method. Thus, the surface modification using the above solid state method has a defect in that the modification effect is very low as compared with the modification in an aqueous system in which a modifier is present as fine particles.

SUMMARY OF THE INVENTION

It is an object of the present invention to provide a coated pigment which is highly surface-modified without being restricted by the properties of a water-insoluble organic surface modifier and the affinity of the water-insoluble organic surface modifier to a pigment, and a colorant composition containing the coated pigment.

It is another object of the present invention to provide a coated pigment which is highly surface-modified without emulsifying a water-insoluble organic surface modifier with a surfactant or a rosin, and a colorant composition containing the coated pigment.

It is further another object of the present invention to provide a coated pigment which is highly surface-modified without treating a pigment and a modifier at a high temperature at which the pigment excessively undergoes the growth of its crystal, and a colorant composition containing the coated pigment.

According to the present invention, there is provided a coated pigment produced by preparing a mixture of water and a substantially water-insoluble organic surface modifier, pressurizing the mixture, introducing the mixture into a flow path having a diameter-decreased portion and a turning portion to cause a shear force in the mixture of which the flow is accelerated while the mixture is passing the diameter-decreased portion, mutual collision of the mixture of which the flow has been accelerated or collision of the mixture of which the flow has been accelerated against a wall constituting the flow path, thereby obtaining an aqueous dispersion in which the substantially water-insoluble organic surface modifier is homogeneously dispersed in the water, mixing the aqueous dispersion with a pigment to coat the pigment with the substantially water-insoluble organic surface modifier, and isolating the pigment coated with the substantially water-insoluble organic surface modifier.

Further, according to the present invention, there is provided a colorant composition containing the above coated pigment and a vehicle.

DETAILED DESCRIPTION OF THE INVENTION

The pigment used in the present invention includes an organic pigment and an inorganic pigment. Specifically, the pigment includes those specified as CI pigments in the color index (CI). The pigment used in the present invention preferably has the form of a pigment produced in an aqueous system, for homogeneously and effectively coating it with a substantially water-insoluble organic surface modifier.

With regard to a pigment produced in an organic solvent, the organic solvent may be removed and converted to an aqueous dispersion, or a dry powder of the pigment may be dispersed in water with a dispersing apparatus such as a sand mill, a ball mill, an atritor, a paint conditioner or a high-speed mixer, and the aqueous dispersion or the dispersion of the pigment in water may also be used in the present invention.

The substantially water-insoluble organic surface modifier used in the present invention may be any one of a liquid and a solid at room temperature. For producing the aqueous dispersion, or for producing a high modification effect, it is preferred to use a modifier which is a liquid or which is a solid but is converted to a liquid, preferably a liquid having a low viscosity by heating, as the substantially water-insoluble organic surface modifier.

The substantially water-insoluble organic surface modifier used in the present invention includes olefinic hydrocarbons, aliphatic carboxylic acids, amine salts or alkyl esters of these, aromatic carboxylic acids, amine salts or alkyl esters of these, synthetic resins, natural resins, rosin derivatives, varnishes, high-molecular-weight dispersing agents, and organic pigment derivatives. These modifiers may be used alone or in combination.

Examples of the olefinic hydrocarbons include butadiene, n-paraffin, paraffin wax and olefin wax. Examples of the aliphatic carboxylic acids include higher monocarboxylic acids such as octanoic acid, lauric acid, myristic acid, stearic acid, oleic acid and behenic acid, and dicarboxylic acids such as succinic acid, azelaic acid, sebacic acid, dodecanoic diacid and 1,4-cyclohexanedicarboxylic acid. Examples of the aromatic carboxylic acids include naphthalenedicarboxylic acid, anthraquinonedicarboxylic acid and terephthalic acid. Amine salts or alkyl esters of the above aliphatic carboxylic acids or aromatic carboxylic acids may be also used.

Examples of the synthetic resins include polyethylene, polypropylene, polybutadiene, ethylene ionomers, polyvinyl chloride, polyvinylidene chloride, ABS resin, acrylic resin, methacrylic resin, polyvinyl alcohol, cellulose plastics, epoxy resin, polyester resin, phenolic resin, urea resin, melamine resin, polyurethane resin, silicone resin, polyamide resin, polystyrene, polyacetal, polycarbonate, polyphenylene ether, polyphenylene sulfite, polysulfone, polyetherimide, polyether ketone and aniline polymer. Further, natural resins may be used.

Examples of the rosin derivatives include polymerized rosin, rosin amine, rosin ester, oxidized rosin, lime rosin, rosin alkylene oxide adduct, rosin alkyd adduct, and rosin-modified phenol.

The rosin alkylene oxide adduct includes compounds of the following formula (1), $$Q-(CH_2-CHR-O-)_p-H \quad (1)$$

wherein Q is a rosin residue, R is hydrogen or an alkyl group having 1 to 3 carbon atoms, and p is an integer of 1 to 30.

The rosin of the above rosin alkylene oxide adduct includes natural rosins such as wood rosin, gum rosin and tall oil rosin, and modified rosins such as polymerized rosin, disproportionated rosin, hydrogenated rosin, oxidized rosin and maleated rosin.

The alkylene oxide of the above rosin alkylene oxide adduct preferably includes ethylene oxide, propylene oxide and a mixture of these. The molar amount of the alkylene oxide forming the adduct, per equivalent of the carboxyl group of the rosin, is preferably 1 to 30 mol. When the molar amount of the alkylene oxide is greater than 30 mol, the adduct has high hydrophilic nature so that it can be directly dissolved in water for use as an organic surface modifier without applying the present invention thereto.

The rosin alkyd adduct includes compounds of the following formula (2), $$Q-(A)_q-H \quad (2)$$

wherein Q is a rosin residue, A is an alkyd resin residue and q is an integer of 1 to 30.

The rosin of the rosin alkyd adduct includes natural rosins such as wood rosin, gum rosin and tall oil rosin, and modified rosins such as polymerized rosin, disproportionated rosin, hydrogenated rosin, oxidized rosin and maleated rosin.

The alkyd of the rosin alkyd adduct includes those synthesized from polyhydric alcohols such as glycerin, ethylene glycol, triethylene glycol, propylene glycol and pentaerythritol, polyhydric carboxylic acids such as phthalic anhydride and maleic anhydride, and modifiers such as linseed oil, tung oil and soybean oil. The molar amount of the alkyd per equivalent of the carboxyl group of the rosin is preferably 1 to 30 mol.

The rosin-modified phenol is obtained by the condensation of a rosin selected from natural rosins such as wood rosin, gum rosin and tall oil rosin and modified rosins such as polymerized rosin, disproportionated rosin, hydrogenated rosin, oxidized rosin and maleated rosin; an alkylphenol selected from phenol, p-tert-butylphenol, p-octylphenol, p-nonylphenol, cresol and bisphenol A; an aldehyde selected from form aldehyde, p-formaldehyde and acetaldehyde; a polyhydric alcohol selected from glycerin, ethylene glycol, triethylene glycol, propylene glycol and pentaerythritol; and optionally polyhydric carboxylic acid selected from phthalic anhydride, maleic anhydride and trimellitic acid, by a conventional method at 200° to 300° C.

Examples of the varnishes include offset ink varnish, gravure ink varnish, paint varnish and varnish for a water-based color.

The offset ink varnish specifically contains 20 to 50% by weight of a rosin-modified phenolic resin, a petroleum resin, an alkyd resin or a drying oil-modified resin of any one of these, 0 to 30% by weight of linseed oil, tung oil or soybean oil, and 10 to 60% by weight of a solvent such as n-paraffin, isoparaffin, aromatic, naphthene or an α-olefin.

The gravure ink varnish contains 10 to 50% by weight of gum rosin, wood rosin, tall oil rosin, lime rosin, rosin ester, a maleic acid resin, a polyamide resin, a vinyl resin, nitrocellulose, cellulose acetate, ethyl cellulose, chlorinated rubber, cyclized rubber, a ethylene-vinyl acetate copolymer, a polyurethane resin, a polyester resin, an alkyd resin, an acrylic resin, gilsonite, dammar, shellac, a mixture of at least two of these resins, a water-soluble resin obtained by water-solubilizing at least one of these resins or a mixture of at least two of these resins or an emulsion resin of at least one of these resins, and 30 to 80% by weight of a hydrocarbon, an alcohol, a ketone, an ether alcohol, an ether, an ester or water.

The paint varnish contains 20 to 80% by weight of an acrylic resin, an alkyd resin, an epoxy resin, chlorinated rubber, a synthetic resin emulsion, a silicone resin, a fluorine resin, a polyurethane resin, a polyester resin, a melamine resin, a urea resin, a mixture of at least two of these resins, a water-soluble resin obtained by water-solubilizing at least one of these resins or a mixture of at least two of these resins or an emulsion resin of at least one of these resins, and 10 to 60% by weight of a hydrocarbon, an alcohol, a ketone, an ether alcohol, an ether, an ester or water.

Examples of the high-molecular-weight dispersing agents include sulfonic acid amide-containing polymer dispersing agents, hydroxystearic acid-containing polymer dispersing agents and ε-caprolactam-containing polymer dispersing agents. Specific examples of the high-molecular-weight dispersing agents include a 12-hydroxystearic acid condensate, Solsperse 3000, 17000 and 24000 supplied by Zeneca Colours, and BYK-160, 161, 162 and 181 supplied by BYK-Chemie GmbH.

Examples of the organic pigment derivatives include compounds of the following formulae (3) to (9).

(3)

wherein P is an organic dyestuff residue or a heterocyclic resin residue, A is —SO₃ or —COO, X is hydrogen, Ca, Ba, Sr, Al, Mn, a primary, secondary or tertiary amine or quaternary ammonium salt containing an alkyl or alkenyl group having 1 to 30 carbon atoms or a primary, secondary, or tertiary amine or quaternary ammonium salt containing an alkyl or alkenyl group having 1 to 30 carbon atoms and containing a polyalkylene oxide having 2 to 5 carbon atoms and having a polymerization degree of 1 to 30, k is a valence of X, and n is an integer of 1 to 4.

(4)

wherein P is an organic dyestuff residue or a heterocyclic ring residue, A is —CH₂NH—, —SO₂NH—, —CH₂NHCOCH₂NH—, —CONH—, —SO₂—, —CH₂NHCOCH₂—, —CO— or a direct bond, each of R¹ and R² is independently hydrogen, an alkyl group having 1 to 18 carbon atoms or a substituted alkyl group having 1 to 18 carbon atoms, or a combination of R¹ and R² is a heterocyclic ring containing N, O or S, a substituted heterocyclic ring containing N, O or S or an alkylene oxide having 2 to 5 carbon atoms and a polymerization degree of 1 to 30, m is an integer of 0 to 6, and n is an integer of 1 to 4.

(5)

wherein P is an organic dyestuff residue or a heterocyclic ring residue, A is —CH₂NH—, —SO₂NH—, —CH₂NHCOCH₂NH—, —CONH—, —SO₂—, —CH₂NHCOCH₂—, —CO— or a direct bond, each of R³ and R⁴ is independently hydrogen, an alkyl group having 1 to 18 carbon atoms or a substituted alkyl group having 1 to 18 carbon atoms, or a combination of R³ and R⁴ is a heterocyclic ring containing N, O or S, a substituted heterocyclic ring containing N, O or S or an alkylene oxide having 2 to 5 carbon atoms and a polymerization degree of 1 to 30, Z is alkylbenzenesulfonic acid, alkylnaphthalenesulfonic acid, sulfonic acid of higher fatty acid, sulfuric acid ester of olefin, sulfuric acid ester of higher alcohol, sulfuric acid ester of alkyl phenol, sulfuric acid ester of higher fatty acid, sulfuric acid ester of polyhydric alcohol fatty acid partial ester, phosphate ester of higher alcohol, phosphate ester of alkylphenol, phosphate ester of higher fatty acid, phosphate ester of polyhydric alocohol fatty acid partial ester, polyacrylic acid or polymethacrylic acid, m is an integer of 0 to 6 and n is an integer of 1 to 4.

(6)

wherein P is an organic dyestuff residue or a heterocyclic ring residue, each of R⁵ to R⁸ is hydrogen, halogen, nitro, amino, sulfone, carboxyl or lower alkyl, and n is an integer of 1 to 4.

(7)

wherein P is an organic dyestuff residue or a heterocyclic residue, each of R⁵ to R⁸ is hydrogen, halogen, nitro, amino, sulfone, carboxyl or lower alkyl, X is hydrogen, a quaternary ammonium salt containing at least one alkyl or alkenyl group having 1 to 20 carbon atoms, Ca, Ba, Sr, Al or Mn, k is a valence of X, and n is an integer of 1 to 4.

(8)

wherein P is an organic dyestuff residue or a heterocyclic ring residue, A is a direct bond, —CONH—X₂—, —SO₂NH—X₂— or —CH₂NHCOCH₂NH—X₂— in which X₂ is alkenyl, substituted alkenyl, arylene or substituted arylene, X₁ is —NH— or —O—, Y is hydroxyl, alkoxyl or —X—(CH₂)ₘN(R¹,R²) or, when n is 1, Y may be —NH—A—P, each of R¹ and R² is independently alkyl or substituted alkyl, or a combination of R¹ and R² a heterocyclic ring containing N, O or S or a substituted heterocyclic ring containing N, O or S. m is an integer of 1 to 6, and n is an integer of 1 to 4.

Specific examples of the organic pigment derivatives used in the present invention include the following compounds.

| | | |
|---|---|---|
| Compound 1 | $P-(SO_3H)_3$ | P = CI Pigment Violet 23 |
| Compound 2 | $P-COOH$ | P = CI Pigment Blue 15 |
| Compound 3 | $P-SO_3^-(Al/3)^+$ | P = CI Pigment Blue 15 |
| Compound 4 | $P-SO_3^-H_3N^+(CH_2)_{11}CH_3$ | P = CI Pigment Blue 15 |
| Compound 5 | $P-[SO_3^-H_2N^+(CH_2)_7CH_3]_2$ | P = CI Pigment Blue 15 |
| Compound 6 | $P-\left[SO_3^-H^+N(CH_3)(CH_2)_{17}CH_3(CH_3)\right]_2$ | P = CI Pigment Blue 15 |
| Compound 7 | $P-SO_3^-\!\!^+N[(CH_2)_{11}CH_3]_2(CH_3)_2$ | P = CI Pigment Red 57 |
| Compound 8 | $P-[CH_2N(C_2H_5)_2]_2$ | P = CI Pigment Blue 15 |
| Compound 9 | $P-CH_2-N\!\!\diagup\!\!\diagdown$ (piperidine) | P = CI Pigment Yellow 12 |
| Compound 10 | $P-CH_2NH(CH_2)_3(C_2H_5)_2$ | P = CI Pigment Red 57 |
| Compound 11 | $P-SO_2NH(CH_2)_3N(C_4H_9)_2$ | P = CI Pigment Violet 19 |
| Compound 12 | $P-CH_2NHCO(CH_2)_2N(CH_3)_2$ | P = CI Pigment Green 7 |
| Compound 13 | $P-CONH(CH_2)_2(C_2H_5)_2$ | P = CI Pigment Red 5 |
| Compound 14 | $P-SO_2NH(CH_2)_3N^+H(C_4H_9)_2\!-\!O_3S\!-\!C_6H_4\!-\!C_{12}H_{25}$ | P = CI Pigment Red 48 |
| Compound 15 | $-[CH_2-CH(COO^-\!+\!N(H)(H_2C)_3HNO_2S-P)(C_2H_5)(C_2H_5)]_n-$ | P = CI Pigment Blue 15 |
| Compound 16 | $P-SO_2NH(CH_2CH_2O)_{25}H$ | P = CI Pigment Blue 15 |
| Compound 17 | $P-[SO_2N(CH_3)(CH_2CH(CH_3)O)_5H]_3$ | P = CI Pigment Blue 15 |
| Compound 18 | $P-CH_2N(CO)_2C_6H_4$ (phthalimide) | P = CI Pigment Blue 15 |
| Compound 19 | $P-CH_2N(CO)_2C_6Cl_4$ (tetrachlorophthalimide) | P = CI Pigment Blue 15 |
| Compound 20 | $P-CH_2NHCO-C_6H_4-COOH$ | P = CI Pigment Blue 15 |

Although differing depending upon the field where the pigment is used, generally, the amount of the substantially water-insoluble organic surface modifier per 100 parts by weight of the pigment is preferably 0.5 to 300 parts by weight, more preferably 1 to 200 parts by weight. When this amount is less than 0.5 part by weight, the substantially water-insoluble organic surface modifier shows almost no effect. When it exceeds 300 parts by weight, undesirably, an excess amount of an aqueous dispersion of the substantially water-insoluble organic surface modifier is sometimes washed away in the steps of filtration and/or white washing the pigment with water, thereby sometimes clogging the filter with the substantially water-insoluble organic surface modifier.

The aqueous dispersion of the substantially water-insoluble organic surface modifier can be obtained by preparing a preliminary mixture of water and the substantially water-insoluble organic surface modifier and introducing the mixture into an ultrahigh-pressure dispersing apparatus. A surfactant or a rosin emulsion may be added to the mixture so long as the object of the present invention is not impaired.

The ultrahigh-pressure dispersing apparatus is not specially limited so long as the mixture of water and the substantially water-insoluble organic surface modifier can be introduced at least 200 kg/cm$^2$. For example, the ultrahigh-pressure dispersing apparatus is selected from a Gaulin homogenizer (supplied by Gaulin Corporation) and a nanomizer (supplied by Nanomizer Inc.).

Figure 1:
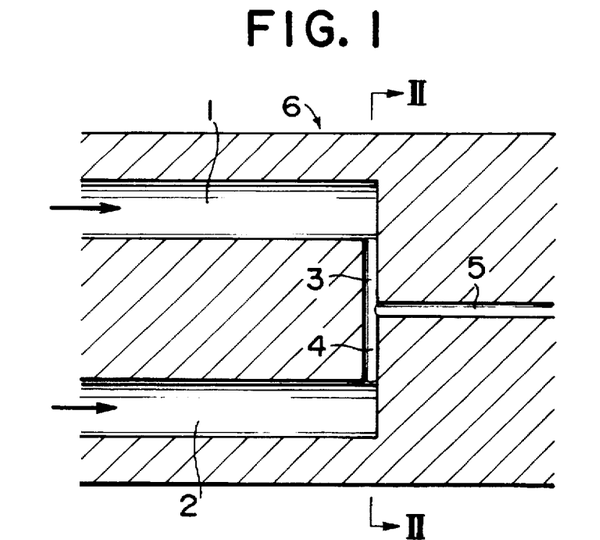
FIG. 1 is a schematic cross-sectional view of an ultrahigh-pressure dispersing apparatus in which two portions of a mixture containing water and the substantially water-insoluble organic surface modifier are allowed to collide with each other.
Figure 2:
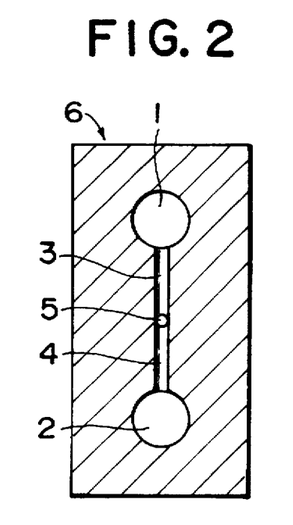
FIG. 2 is a schematic cross-section view of a II—II line portion taken from an ultrahigh-pressure dispersing apparatus shown in FIG. 1.
Figure 3:
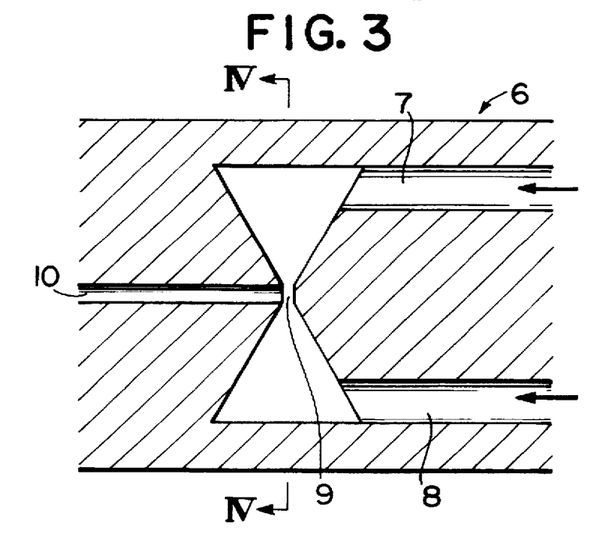
FIG. 3 is a schematic cross-sectional view of an ultrahigh-pressure dispersing apparatus in which two portions of a mixture containing water and the substantially water-insoluble organic surface modifier are allowed to collide with each other.
Figure 4:
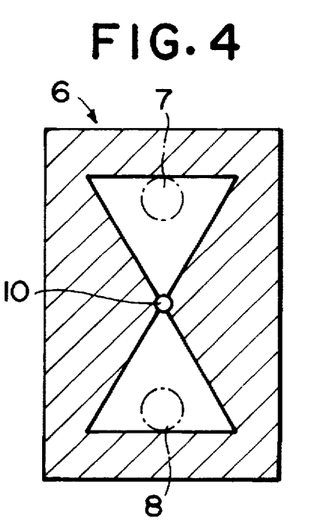
FIG. 4 is a schematic cross-section view of a IV—IV line portion taken from an ultrahigh-pressure dispersing apparatus shown in FIG. 3.
Figure 5:
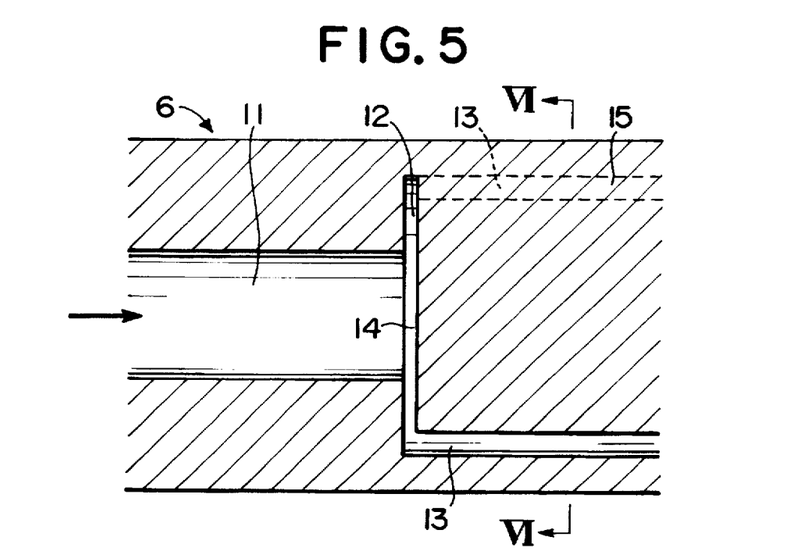
FIG. 5 shows a schematic cross-sectional view of an ultrahigh-pressure in which a mixture containing water and the substantially water-insoluble organic surface modifier is allowed to collide against a wall.
Figure 6:
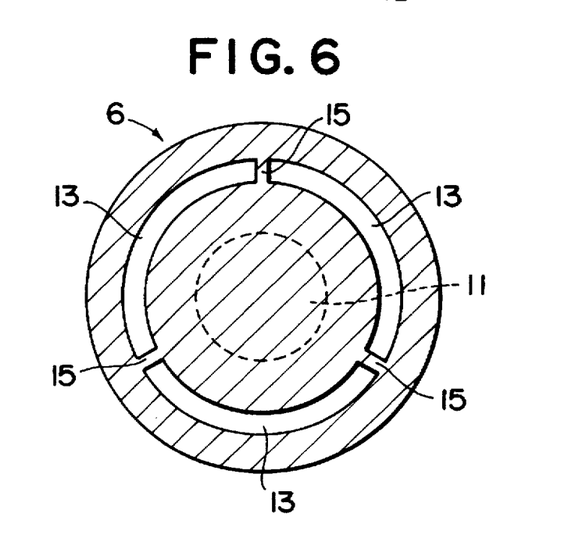
FIG. 6 is a schematic cross-section view of a VI—VI line portion taken from an ultrahigh-pressure dispersing apparatus shown in FIG. 5.

FIGS. 1 to 6 show schematic internal structures of ultrahigh-pressure dispersing apparatus. In FIGS. 1 and 2, a mixture containing water and the substantially water-insoluble organic surface modifier is separated and introduced through flow paths 1 and 2 at a pressure of at least 200 kg/cm$^2$ in an arrow direction, two separated portions of the mixture are allowed to collide with each other near the inlet to a flow path 5, and recovered through the flow path 5. In FIG. 1, numeral 6 is an ultrahigh-pressure dispersing apparatus. The flow path 1 has a diameter-decreased portion 3, and the flow path 2 has a diameter-decreased portion 4. Further, the flow path 5 has a diameter smaller than those of the flow paths 1 and 2. In the diameter-decreased portions 3 and 4, the flow of the mixture is accelerated so that a shear force is exerted on the mixture to promote the dispersing of the mixture. In FIGS. 3 and 4, a mixture containing water and the substantially water-insoluble organic surface modifier is separated and introduced through flow paths 7 and 8 at a pressure of at least 200 kg/cm$^2$ in an arrow direction, and two separated portions of the mixture are allowed to collide with each other near the inlet to a flow path 10, and recovered through the flow path 10. The flow path 7 and the flow path 8 have a diameter-decreased portion 9 toward the inlet to the flow path 10. In FIGS. 5 and 6, a mixture containing water and the substantially water-insoluble organic surface modifier is introduced through a flow path 11 at a pressure of at least 200 kg/cm$^2$, allowed to collide against a wall 14, passed through a flow path 12, and recovered through a flow path 13. Numeral 15 is a support.

When the substantially water-insoluble organic surface modifier is a liquid at room temperature, the aqueous dispersion is preferably prepared by preparing a mixture of the substantially water-insoluble organic surface modifier and water at room temperature with a high-speed mixer, a homomixer or a low-pressure dispersing apparatus and dispersing the mixture under an ultra-high pressure.

When the substantially water-insoluble organic surface modifier becomes a liquid at a temperature equivalent to, or below, the boiling point of water, the above aqueous dispersion is preferably prepared by heating the substantially water-insoluble organic surface modifier to its melting point, preparing a mixture of the substantially water-insoluble organic surface modifier and water at a temperature equivalent to, or above, the melting point of the substantially water-soluble organic surface modifier, with a high-speed mixer, a homomixer or a low-pressure dispersing apparatus and dispersing the mixture under an ultra-high pressure.

When the substantially water-insoluble organic surface modifier is a solid, it is preferable to prepare a preliminary dispersion of the organic surface modifier in water with a dispersing apparatus such as a sand mill, a ball mill, an atritor, a paint conditioner or a high-speed mixer and introduce the mixture into the flow path for dispersing it under ultra-high pressure.

Further, part or most of a solid substantially water-insoluble organic surface modifier may be dissolved in an organic solvent before water is added and the mixture is dispersed under ultra-high pressure.

The amount of the substantially water-insoluble organic surface modifier is properly 1 to 80% by weight, preferably 5 to 60% by weight, based on water. The higher the concentration of the organic surface modifier, the more effective the production is. However, when the above amount exceeds 80% by weight, it is difficult to obtain an aqueous dispersion. When it is less than 1×by weight, not only is the production efficiency is poor, but also it is difficult to obtain an aqueous dispersion.

The pressure for introducing the mixture of water and the substantially water-insoluble organic surface modifier in the present invention is preferably at least 200 kg/cm$^2$. The higher the pressure, the more stable the resultant aqueous dispersion is. When the above pressure is lower than 200 kg/cm$^2$, the substantially water-insoluble organic surface modifier rapidly separates from water so that it is difficult to obtain an aqueous dispersion.

The coated pigment of the present invention can be produced by adding the aqueous dispersion to a pigment and mixing these with stirring. It is preferable to add the aqueous dispersion to an aqueous slurry of the pigment in which the particles of the pigment are present in the state of fine particles, since the pigment can be uniformly and effectively coated with the substantially water-insoluble organic surface modifier.

The temperature for the above mixing the aqueous dispersion with the pigment and the stirring of the mixture is required to be set between room temperature and the boiling point of water. After the above mixing and stirring, it is preferable to carry out the following procedures for some substantially water-insoluble organic surface modifiers. That is, the mixture containing the aqueous dispersion and the pigment is alkalified or acidified or converted to a metal salt or amine salt to precipitate the substantially water-insoluble organic surface modifier on the pigment. However, the substantially water-insoluble organic surface modifier can be effectively fully coated on the pigment by physical adsorption without carrying out the above procedure.

The coated pigment is the recovered by filtration and washing-with-water steps according to a conventional method. A water-soluble organic surface modifier may be used in combination as required.

The coated pigment of the present invention may be used in the state of paste as it is produced, or it may be used in the state of a powder after it is dried or milled.

The colorant composition of the present invention is obtained by dispersing the coated pigment of the present invention in a vehicle containing a vehicle resin and/or a solvent. The colorant composition includes an offset ink, a gravure ink, a coating composition, a plastic and a water-based color. The above vehicle is not specially limited, and it may contain an auxiliary and an extender pigment.

When the coated pigment of the present invention is dispersed in the vehicle, it is preferable to use a dispersing apparatus such as a dissolver, a high-speed mixer, a homomixer, a sand mill, an attriter, a two-roll mill or a three-roll mill.

The coated pigment is generally used in the state of a powder when dispersed in a vehicle. However, when the coated pigment is water-based, or when it is used for an offset ink or polyethylene, the coating pigment is in the state of a paste which may be directly dispersed in a vehicle without carrying out the step of drying the coated pigment.

When the vehicle is for an offset ink, the vehicle contains 20 to 50% by weight of a rosin-modified phenolic resin, a petroleum resin, an alkyd resin or a drying oil-modified resin of any one of these, 0 to 30% by weight of linseed oil, tung oil or soybean oil, and 10 to 60% by weight of a solvent such as n-paraffin, isoparaffin, aromatic, naphthene or an α-olefin.

When the vehicle is for a gravure ink, the vehicle contains 10 to 50% by weight of gum rosin, wood rosin, tall oil rosin, lime rosin, rosin ester, a maleic acid resin, a polyamide resin, a vinyl resin, nitrocellulose, cellulose acetate, ethyl cellulose, chlorinated rubber, cyclized rubber, a ethylene-vinyl acetate copolymer, a polyurethane resin, a polyester resin, an alkyd resin, an acrylic resin, gilsonite, dammar, shellac, a mixture of at least two of these resins, a water-soluble resin obtained by water-solubilizing at least one of these resins or a mixture of at least two of these resins or an emulsion resin of at least one of these resins, and 30 to 80% by weight of a hydrocarbon, an alcohol, a ketone, an ether alcohol, an ether, an ester or water.

When the vehicle is for a coating composition, the vehicle contains 20 to 80% by weight of an acrylic resin, an alkyd resin, an epoxy resin, chlorinated rubber, a synthetic resin emulsion, a silicone resin, a fluorine resin, a polyurethane resin, a polyester resin, a melamine resin, a urea resin, a mixture of at least two of these resins, a water-soluble resin obtained by water-solubilizing at least one of these resins or a mixture of at least two of these resins or an emulsion resin of at least one of these resins, and 10 to 60% by weight of a hydrocarbon, an alcohol, a ketone, an ether alcohol, an ether, an ester or water.

The vehicle for plastics includes polyethylene, polypropylene, polybutadiene, ethylene ionomer, polyvinyl chloride, polyvinylidene chloride, ABS resin, acrylic resin, methacrylic resin, polyvinyl alcohol, cellulose-based plastic, epoxy resin, polyester resin, phenolic resin, urea resin, melamine resin, polyurethane resin, silicone resin, polyamide resin, polystyrene, polyacetal, polycarbonate, polyphenylene ether, polyphenylene sulfite, polysulfone, polyetherimide, polyether ketone and complexes of these.

The vehicle for a water-based color contains at least one of nonionic, anionic and cationic surfactants or sulfonic acid amide-containing, hydroxystearic acid-containing and ε-caprolactam-containing high-molecular-weight dispersing agents, a polyhydric alcohol selected from glycerin, ethylene glycol, triethylene glycol, propylene glycol and pentaerythritol, water, and optionally an amine, an antiseptic and an antifoaming agent.

According to the present invention, a predetermined amount of the substantially water-insoluble organic surface modifier is mixed with a predetermined amount of water, the resultant mixture is pressurized, and introduced into an ultrahigh-pressure dispersing apparatus having a flow path diameter-decreased portion and a turning portion at a pressure of at least 200 kg/cm$^2$, to cause a shear force in the mixture of which the flow is accelerated while the mixture is passing the diameter-decreased portion, mutual collision of the mixture of which the flow has been accelerated and collision of the mixture of which the flow has been accelerated against a wall constituting the flow path, whereby an aqueous dispersion for which the preparation has been previously impossible can be obtained in the absence of a surfactant or a rosin emulsion or in the presence of a surfactant or a rosin emulsion in such a small amount that the object of the present invention is not impaired. It is considered that the substantially water-insoluble organic surface modifier is finely pulverized to a molecular level by the collision under a high pressure to form a stable aqueous dispersion owing to an intermolecular attracting force between water and the substantially water-insoluble organic surface modifier.

In the present invention, the substantially water-insoluble organic surface modifier which is finely pulverized as described above is mixed with a pigment, whereby the surface of each particle of the pigment is coated with molecules of the substantially water-insoluble organic surface modifier. Therefore, the present invention produces a remarkably effective surface modification effect with the substantially water-insoluble organic surface modifier in a small amount as compared with the conventional coating of a pigment with emulsion particles.

EXAMPLES

The present invention will be detailed hereinafter with reference to Examples, in which "part" and "%" stand for "part by weight" and "% by weight".

Example 1

A mixture of 50 parts of water and 50 parts of an adduct of 1 mol of rosin with 3 mol of propylene oxide was heated to 80° C., and introduced into a nanomizer (supplied by Nanomizer Inc.) at a pressure of 1,000 kg/cm$^2$ to disperse the mixture in the nanomizer. This introduction for the dispersing in the nanomizer was repeated three times to give an aqueous dispersion. 10 Parts of the aqueous dispersion was added to a water-based slurry prepared by dispersing 100 parts, as a dry product, of a CI Pigment Blue 15:3 (obtained by forming copper phthalocyanine into a pigment by a conventional method using a kneader and removing a kneading aid) in 1,000 parts of water, and the mixture was stirred for 30 minutes, filtered, washed with water and dried to give 103 parts of a coated pigment.

The above-obtained coated pigment was excellent in dispersibility. That is, it gave an offset ink having an average particle size (measured with a grindometer) of less than 5 μm by dispersing it with a three-roll mill twice, while a coated pigment obtained in Comparative Example 1 to be described below required the above dispersing treatment three times.

Comparative Example 1

A copper phthalocyanine was formed into a pigment in the same manner as in Example 1. In this case, 5 parts of an adduct of 1 mol of rosin with 3 mol of propylene oxide was added when the kneading was completed 90%, and the mixture was co-kneaded for a remaining kneading time of 10 %. A kneading aid was removed, and the remainder was filtered, washed with water and dried to give 103 parts of a coated pigment.

Comparative Example 2

A mixture of 50 parts of water and 50 parts of an adduct of 1 mol of rosin with 3 mol of propylene oxide were heated to 80° C., and introduced into a nanomizer (supplied by Nanomizer Inc.) at a pressure of 100 kg/cm$^2$ to disperse the mixture in the nanomizer. This introduction for the dispersing in the nanomizer was repeated five times, while no aqueous dispersion was obtained since an oil layer and an aqueous layer separated promptly. The same mixture as above was dispersed with a homomixer, or dispersed with a sand mill, to give no aqueous dispersion. That is, no aqueous dispersion was obtained for treating a pigment in an aqueous system.

Example 2

50 Parts of an adduct of 1 mol of rosin with 3 mol of propylene oxide was mixed with a mixture containing 25 parts of water and 25 parts of methyl alcohol with stirring, to prepare a semi-solution. The semi-solution at 25° C. was treated by introducing it into a nanomizer (supplied by Nanomizer Inc.) at a pressure of 1,000 kg/cm$^2$ three times, and thereafter, 103 part of a coated pigment was obtained in the same manner as in Example 1.

The above-obtained coated pigment was excellent in dispersibility. That is, it gave an offset ink having an average particle size (measured with a grindometer) of less than 5 μm by dispersing it with a three-roll mill twice.

Example 3

A mixture of 70 parts of water and 30 parts of an alkyd varnish for an offset ink was heated to 80° C., and introduced into a nanomizer (supplied by Nanomizer Inc.) at a pressure of 1,700 kg/cm$^2$ and treated with the nanomizer. This introduction for the dispersing in the nanomizer was repeated three times to give an aqueous dispersion. 40 Parts of the aqueous dispersion was added to a water-based slurry prepared by dispersing 100 parts, as a dry product, of a CI Pigment Red 57:1 (synthesized by a conventional method) in 2,000 parts of water, and the mixture was stirred at 70° C. for 30 minutes, filtered, washed with water and dried to give 103 parts of a coated pigment in the form of a paste.

The above coated pigment showed excellent suitability for emulsification. That is, an emulsion of an offset ink containing the above coated pigment showed a surface tension of 67 βS/cm, while the counterpart obtained in Comparative Example 3 to be described later showed a surface tension of 55 dyne/cm.

Comparative Example 3

While a solution containing 80 parts of water and 2 parts of sodium hydroxide was boiled, 10 parts of disproportionated rosin was added to the solution to prepare a rosin solution. The rosin solution was cooled to room temperature. 10 parts of the same alkyd varnish as that used in Example 3, and the mixture was stirred with a high-speed mixer to give a solution of alkyd and rosin in the form of a semi-solid-dissolved solution. Then, 120 parts, as a dry product, of a coated pigment in the form of a paste was obtained in the same manner as in Example 3 except that the aqueous dispersion was replaced with 120 parts of the above solution of alkyd and rosin.

Example 4

A mixture of 50 parts of water and 50 parts of a hydroxystearic acid-containing polymer dispersing agent (Solsperse 17000, supplied by Zeneca Colours) was heated to 80° C., and introduced to a Gaulin homogenizer (supplied by Gaulin) at a pressure of 500 kg/cm and treated with the Gaulin homogenizer to give an aqueous dispersion. 10 Parts of the aqueous dispersion was added to a water-based slurry prepared by dispersing 100 parts of powdery CI Pigment Violet 19 in 2,000 parts of water with a beads mill, and the mixture was stirred at 70° C. for 30 minutes. The mixture was adjusted to a pH of 10, filtered, washed with water and dried to give 103 parts of a coated pigment.

An oil coating composition containing the above coated pigment was prepared (the preparation method will be described later) and measured for a viscosity which showed 800 cps. The counterpart obtained in Comparative Example 4 to be described later showed only a viscosity of 2,000 cps. Thus, as compared to the counterpart, the oil coating composition had an excellent viscosity. For reference, the same pigment as the above was measured for a viscosity to show 3,000 cps. In addition, the viscosity was measured with a Brookfield viscometer at 6 rpm.

Comparative Example 4

An oil coating composition was obtained in the same manner as in Example 4 except that the 10 parts of the aqueous dispersion was replaced with 5 parts of Solsperse.

Comparative Example 5

An attempt was made to dissolve the same hydroxystearic acid-containing high-molecular-weight dispersing agent as that used in Example 4 in water in the presence of an acid, an alkali or a surfactant, while no solution was obtained. Further, an attempt was made to disperse the same hydroxystearic acid-containing high-molecular-weight dispersing agent in water with a high-speed mixer or a sand mill, while no aqueous dispersion was obtained. That is, no aqueous dispersion was obtained for treating a pigment in an aqueous system.

Example 5

A preliminary dispersion prepared by dispersing 10 parts of a copper phthalocyanine derivative of P—SO$_2$NH(CH$_2$)$_3$N(C$_2$H$_5$)$_2$ (wherein P was CI Pigment Blue 15) in 90 parts of water with an atritor was introduced into a nanomizer supplied by Nanomizer Inc. at a pressure of 1,300 kg/cm$^2$ and treated with the nanomizer. This introduction and treatment was repeated three times to give an aqueous dispersion. 50 Parts of the aqueous dispersion was added to a water-based slurry prepared by dispersing 100 parts, as a dry product, of CI Pigment Blue 15:1 (prepared by forming a copper phthalocyanine into a pigment by a conventional method using sulfuric acid and then removing the sulfuric acid) in 1,000 parts of water, and the mixture was stirred at 80° C. for 30 minutes, filtered, washed with water and dried to give 103 parts of a coated pigment.

An oil coating composition containing the above coated pigment showed an excellent viscosity. That is, the oil coating composition showed a viscosity of 150 cps, while the counterpart obtained in Comparative Example 6 to be described later showed a viscosity of 600 cps, and the counterpart obtained in Comparative Example 7 to be described later showed a viscosity of 420 cps. Further, the pigment (CI Pigment Blue 15:1) not treated with the pigment derivative showed a viscosity of 2,700 cps.

Comparative Example 6

An alkyd melamine coating composition was obtained in the same manner as in Example 5 except that the aqueous dispersion was replaced with 5 parts of the same pigment derivative as that used in Example 5.

Comparative Example 7

104 Parts of a coated pigment was obtained by mixing a dispersion of 10 parts of a copper phthalocyanine derivative of P—SO$_2$NH(CH$_2$)$_3$N(C$_2$H$_5$)$_2$ (wherein P was CI Pigment Blue 15) in 90 parts of water with a slurry of 100 parts of a pigment (CI Pigment Blue 15:1) in 1,000 parts of water with a mixer.

Example 6

A mixture of 80 parts of water and 20 parts of powdery polypropylene was introduced to a nanomizer (supplied by Nanomizer Inc.) at a pressure of 1,500 kg/cm$^2$ and treated in the nanomizer. This introduction and treatment was repeated five times to give an aqueous dispersion. 500 Parts of the aqueous dispersion was then added to a water-based slurry prepared by dispersing 100 parts, as a dry product, of CI Pigment Blue 15:3 (prepared by forming copper phthalocyanine into a pigment by a conventional method using a kneader, and removing a kneading aid) in 1,000 parts of water, the mixture was stirred for 30 minutes, filtered, washed with water and dried to give 196 parts of a coated pigment.

The so-obtained coated pigment and a polypropylene resin were mixed with a tumbler, and the resultant composition was injection-molded to give a molded article of the composition. The molded article had a color strength higher, by 24%, than that of a molded article prepared in Comparative Example 8 to be described later, or showed excellent color development. The molded article obtained in this Example was measured for an L value with a color machine, and a sample obtained in Comparative Example 8 to be described later was measured for an L value with the color machine. The difference between these two L values, ΔL, was calculated to show that the color strength of the coated pigment in this Example was higher, by 24%, than the pigment prepared in Comparative Example 8, or the coated pigment showed excellent color development (The coated pigment in this Example showed the same color density as that of the pigment in Comparative Example 8 even when the amount of the coated pigment in this Example was smaller by 24% by weight). cl Comparative Example 8

CI Pigment Blue 15:3 and the same polypropylene resin as that used in Example 6 were mixed with a tumbler in the same mixing ratio as that in Example 6, and the resultant composition was injection-molded to give a molded article.

Examples 7–32

Aqueous dispersions were prepared in the same manner as in Example 1 except that the pressure for the introduction of mixtures into a nanomizer was changed as shown in Table 1, and pigments shown in Table 1 were treated with the aqueous dispersions to obtain colorant compositions shown in Table 1.

TABLE 1

| | Aqueous Dispersion | | | Pigment Composition | | | |
|---|---|---|---|---|---|---|---|
| | Organic surface modifier | Concentration (%) | Pressure (kg/cm$^2$) | CI Pigment (100 parts) | Aqueous dispersion (part) | Colorant Composition | Effects |
| Ex. 7 | Paraffin wax | 30 | 1,000 | Red 57:1 | 20 | offset | fluidity |
| Ex. 8 | Polyethylene wax | 30 | 1,000 | Violet 23 | 20 | plastic | dispersibility |
| Ex. 9 | Stearic acid | 50 | 800 | Blue 15:3 | 10 | coating composition | viscosity |
| Ex. 10 | Oleic acid amide | 50 | 800 | Blue 15:3 | 6 | offset | fluidity |
| Ex. 11 | Sebacic acid | 50 | 800 | Blue 15:3 | 6 | offset | fluidity |
| Ex. 12 | Laurylamine | 70 | 1,300 | Yellow 12 | 4 | offset | fluidity |
| Ex. 13 | Distearyl-dimethyl quaternay ammonium chloride | 60 | 1,300 | Red 57:1 | 8 | gravure | gloss |

TABLE 1-continued

| | | | | | | | |
|---|---|---|---|---|---|---|---|
| Ex. 14 | Polystyrene | 10 | 1,000 | Blue 15:3 | 100 | plastic | heat resistance |
| Ex. 15 | Styrene/ acrylic resin | 10 | 1,000 | Blue 15:3 | 50 | water-based coating composition | fluidity |
| Ex. 16 | Aniline Polymer | 20 | 1,000 | Blue 15:3 | 25 | coating composition | weather-ability |
| Ex. 17 | Poly-methacrylic acid | 10 | 1,000 | Violet 19 | 50 | coating composition | weather-ability |
| Ex. 18 | Polymerized rosin*1 | 20 | 400 | Blue 15:3 | 20 | offset | roll-baking |
| Ex. 19 | Rosen ester*2 | 20 | 400 | Blue 15:3 | 20 | offset | dispersibility |
| Ex. 20 | Rosinamine*3 | 40 | 1,000 | Yellow 12 | 12 | offset | fluidity |
| Ex. 21 | Rosin-modified phenol*4 | 10 | 800 | Red 57:1 | 100 | offset | clearness |
| Ex. 22 | Acryl varnish for gravure | 30 | 1,700 | Violet 23 | 30 | gravure | gloss |
| Ex. 23 | Polyester varnish for coating composition | 30 | 1,700 | Blue 60 | 30 | coating composition | viscosity |
| Ex. 24 | High-molecular-weight dispersing agent*5 | 60 | 1,000 | Red 177 | 10 | coating composition | viscosity |
| Ex. 25 | 12-Hydroxy-stearic acid condensate | 40 | 1,300 | Blue 15:1 | 10 | coating composition | viscosity |
| Ex. 26 | Phthalimide-methyl copper phthalocyanine | 10 | 1,300 | Blue 15:3 | 100 | plastic | heat resistance |
| Ex. 27 | Copper phthalocyanine sulfonic acid | 10 | 1,300 | Blue 15:3 | 50 | gravure | gloss |
| Ex. 28 | Compound (A)*6 | 10 | 1,300 | Red 57:1 | 100 | offset | fluidity |
| Ex. 29 | Compound (B)*7 | 10 | 1,300 | Red 48:1 | 80 | gravure | gloss |
| Ex. 30 | Compound (C)*8 | 10 | 1,300 | Violet 23 | 100 | water-based color | density |
| Ex. 31 | Compound (D)*9 | 10 | 1,300 | Blue 15:1 | 100 | coating composition | viscosity |
| Ex. 32 | Compound (E)*10 | 10 | 1,300 | Yellow 154 | 100 | coating composition | viscosity |

Ex. = Example
Notes:
*1 Sylbatac 95 (supplied by Arakawa Chemical Ind. Ltd.)
*2 Estergum AT (supplied by Arakawa Chemical Ind. Ltd.)
*3 Rosinamine D (supplied by Rika Hercules Inc.)
*4 Tamanol 361 (supplied by Arakawa Chemical Ind. Ltd.)
*5 BYK-160 (supplied by BYK Chemie GmbH

*6 Compound A   P = CI Pigment Red 57

*7 Compound B   P = CI Pigment Red 48

*8 Compound C   P = CI Pigment Blue 15

*9 Compound D   P = CI Pigment Blue 15

TABLE 1-continued

*¹⁰Compound E

P = CI Pigment Yellow 154

Amount of aqueous dispersion (part) per 100 parts by weight of pigment
Roll baking = a phenomenon in which a pigment strongly adheres to a roll when an offset ink is prepared by dispersing with a roll mill. When a pigment has poor dispersibility, this phenomenon is liable to occur.
Coating composition in the column of Colorant Composition refers to an oil coating composition.

Preparation Example (Offset ink)

Parts of a pigment and 54 parts of a modified phenolic resin were mixed, and the mixture was dispersed with a three-roll mill to prepare a base ink. 20 Parts of a rosin-modified phenolic resin and 10 parts of a solvent for an offset ink were mixed with the base ink to give an offset ink.

Preparation Example (Gravure ink)

10 Parts of a pigment, 70 parts of a nitrocellulose varnish and 20 parts of ethyl acetate were placed in a 225 ml glass bottle together with 300 g of 3 mmϕ steel balls, and dispersed with a paint conditioner for 1 hour to give a gravure ink.

Preparation Example (Oil coating composition)

10 Parts of a pigment, 52 parts of an alkyd resin varnish (nonvolatile content 60%), 23 parts of a melamine resin varnish (nonvolatile varnish 50%) and 15 parts of xylene were placed in a 225 ml glass bottle together with 300 g of 3 mmϕ steel balls, and dispersed with a paint conditioner for 1 hour to give an oil coating composition.

Preparation Example (Water-based coating composition)

10 Parts of a pigment, 12.5 parts of a solution of an acrylic resin having average molecular weight of 25,000 and an acid value of 60 (nonvolatile content 20%) and 20 parts of ion-exchanged water were placed in a 225 ml glass bottle together with 150 g of 3 mmϕ steel balls, and dispersed with a paint conditioner for 3 hours. Then, 37.5 parts of the same acrylic resin as that described above and 4.3 parts of a methylated melamine resin were added to the dispersion to give a water-based coating composition.

Preparation Example (Plastic colorant composition)

0.1 Part of a pigment, 100 parts of a polypropylene resin and 0.1 part of zinc stearate were mixed with a tumbler, and the mixture was injection-molded to give a colorant composition of polypropylene resin.

Preparation Example (Water-based color)

15 Parts of a pigment, 6 parts of ethylene glycol, 29 parts of water and 10 parts of a nonionic surfactant were placed in a 225 ml glass bottle together with 100 g of 3 mmϕ steel balls, and dispersed with a paint conditioner for 2 hours, and then 40 parts of water was added to give a water-based color.

3 Parts of the above water-based color was mixed with 60 parts of an acrylic resin-containing binder for dyeing to give a color for dyeing.

As explained above, the present invention can utilize, as a surface modifier, a substantially water-insoluble organic substance in the form of any one of a solid and a liquid which cannot be used in conventional methods, and produces excellent effects on surface modification. The coated pigment of the present invention contains neither a surfactant nor a rosin emulsion, so that it is free from adversary effects caused by the surfactant or rosin emulsion, and can be used as a colorant composition without being limited in use.

What is claimed is:

1. An offset ink composition which comprises a coated pigment produced by preparing a mixture of water and a substantially water-insoluble organic surface modifier, pressurizing the mixture, introducing the mixture into a flow path having a diameter-decreased portion and a turning portion to cause a shear force in the mixture of which the flow is accelerated while the mixture is passing the diameter-decreased portion, mutual collision of the mixture of which the flow has been accelerated or collision of the mixture of which the flow has been accelerated against a wall constituting the flow path, thereby obtaining an aqueous dispersion in which the substantially water-insoluble organic surface modifier is homogeneously dispersed in the water, mixing the aqueous dispersion with a pigment to coat the pigment with the substantially water-insoluble organic surface modifier, and isolating the pigment coated with the substantially water-insoluble organic surface modifier, and a vehicle for an offset ink.

2. A composition pigment according to claim 1, wherein the substantially water-insoluble organic surface modifier is at least one selected from the group consisting of olefinic hydrocarbons, aliphatic carboxylic acids, amine salts or alkyl esters of these, aromatic carboxylic acids, amine salts or alkyl esters of these, synthetic resins, natural resins, rosin derivatives, varnishes, high-molecular-weight dispersing agents, and organic pigment derivatives.

3. A composition according to claim 1, wherein the substantially water-insoluble organic surface modifier is a liquid or a solid at a room temperature.

4. A composition according to claim 1, wherein the coated pigment is obtained by mixing a pigment with the aqueous dispersion prepared by introducing the mixture into the flow path having at least 2 flow paths into which two portions of the mixture are introduced, a diameter-decreased flow path where the two portions of the mixture are allowed to collide with each other, and a flow path through which the mixture is recovered.

5. A composition according to claim 1, wherein the coated pigment is obtained by mixing a pigment with the aqueous dispersion prepared by introducing the mixture into the flow path having one flow path into which the mixture is introduced and at least one flow path through which the mixture is recovered.

6. A composition according to claim 1, wherein the mixture has a substantially water-insoluble organic surface modifier concentration of 1 to 80% by weight.

7. A composition according to claim 1, wherein the coated pigment is obtained by mixing a pigment with the aqueous dispersion obtained by allowing the mixture to collide against a wall of the flow path and allowing two portions of the mixture to collide with each other.

8. A composition according to claim 1, wherein the coated pigment is obtained by mixing a pigment with the aqueous dispersion obtained by introducing the mixture into the flow path at a pressure of at least 200 kg/cm$^2$.

* * * * *